A. T. HILL.
WATER METER.
APPLICATION FILED DEC. 14, 1910.

997,553. Patented July 11, 1911.
2 SHEETS—SHEET 1.

WITNESSES.
O. E. Day
Stuart E. Barnes

INVENTOR.
Alva T. Hill
by Parker & Burton
Attorneys.

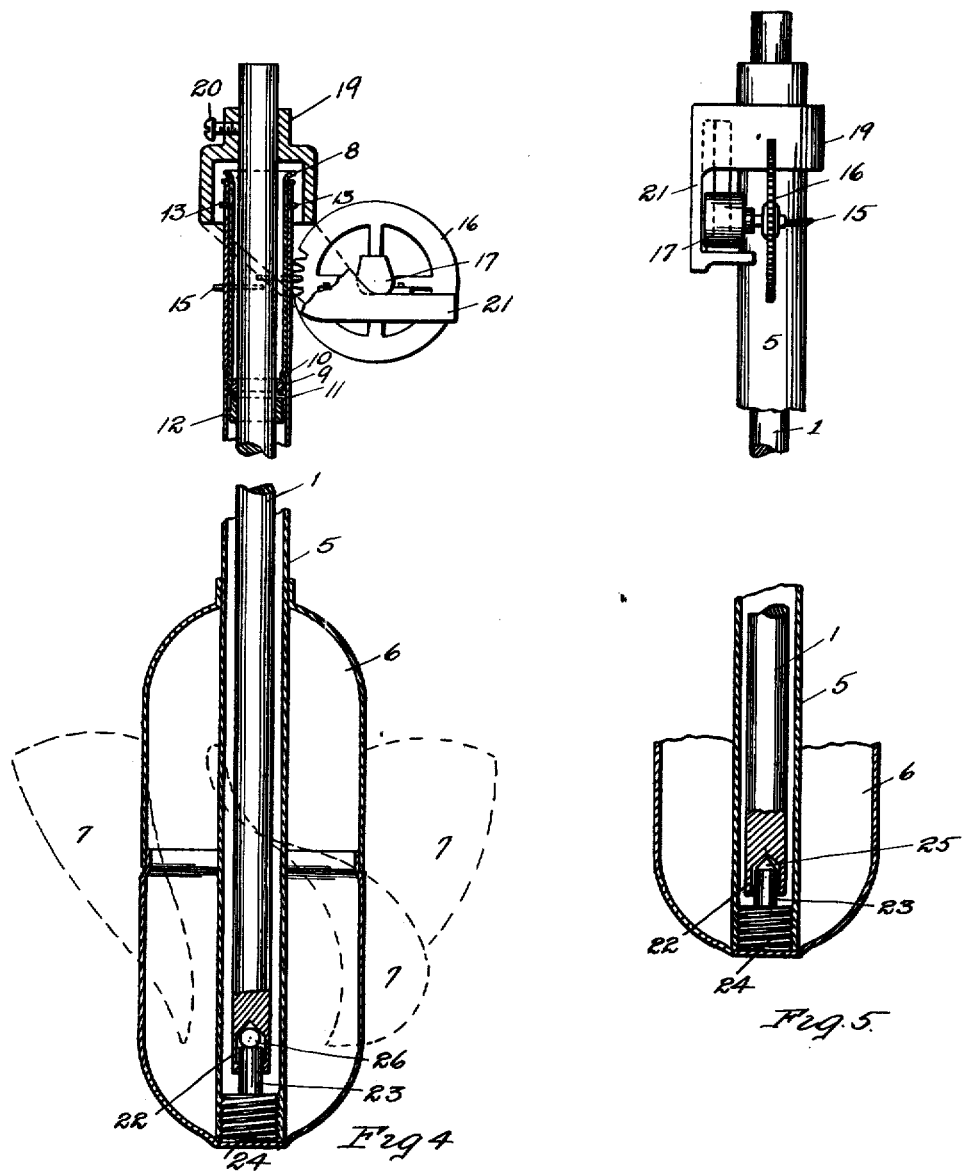

UNITED STATES PATENT OFFICE.

ALVA T. HILL, OF PHOENIX, ARIZONA TERRITORY.

WATER-METER.

997,553.

Specification of Letters Patent.  Patented July 11, 1911.

Application filed December 14, 1910. Serial No. 597,264.

*To all whom it may concern:*

Be it known that I, ALVA T. HILL, a citizen of the United States, residing at Phoenix, county of Maricopa, Territory of Arizona, have invented a certain new and useful Improvement in Water-Meters, and declare the following to be a full, clear, and exact description of the same, such as will enable others skilled in the art to which it pertains to make and use the same, reference being had to the accompanying drawings, which form a part of this specification.

My invention relates to meters for irrigating water, and has for its object a meter whose bearings are inclosed in a water-tight casing and are protected adequately from dirt, grit and injurious substances.

Meters heretofore constructed for irrigating ditches have been subject to many troubles due to the grit and weeds customary in such waters. My invention obviates such troubles by providing a meter which has no joint below the water line and which has a rotating member with a bearing strain upward which is less than the weight of such member.

A further feature is a completely lubricated spindle bearing and a pivot or ball bearing so arranged as to be free from any sediment which may be contained in the lubricant.

Figure 1:
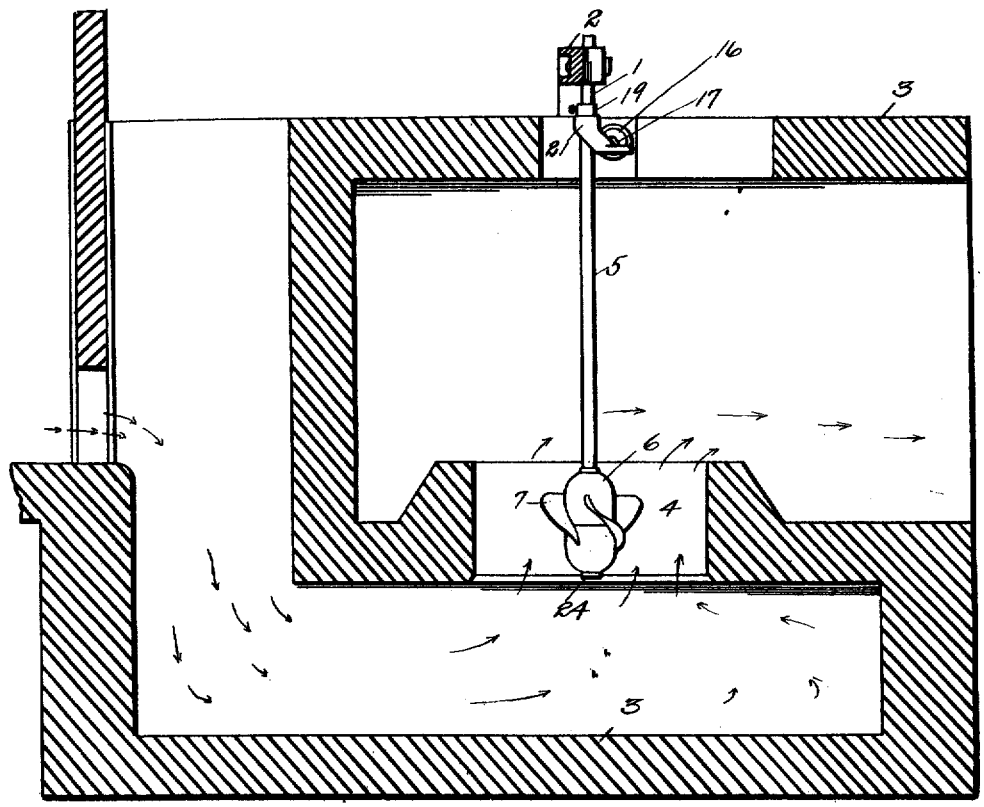
Figure 2:
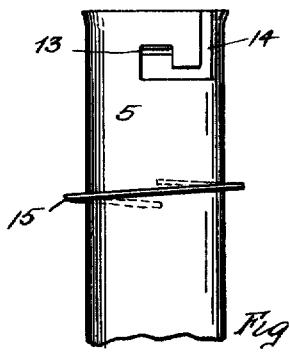
Figure 3:
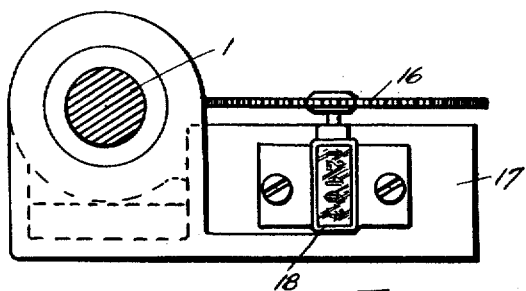
Figure 6:
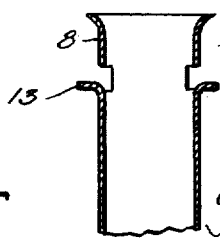

In the drawings:—Figure 1, is a sectional view of a meter casing with the meter in elevation. Fig. 2, is an elevation of the upper part of the tubular shaft showing the attachment of the inner bearing tube. Fig. 3, is a plan view showing the connection with the register and a cross section of the arbor. Fig. 4, is an elevation showing the arbor partly in section, the tube, the shaft, the float and the cap in section. Fig. 5, is an elevation showing the float, shaft and arbor partly in section. Fig. 6 is a vertical section of one end of the inner bearing tube showing the projecting ears.

A hanging arbor 1 is supported by a bracket 2 in the flume box 3. The flume box 3 is constructed to direct the entire flow of the irrigating water through the passage 4. A tubular shaft 5 rotatably mounted on the arbor 1 is provided with a float 6 integral therewith and occupying a central position in the passage 4. Vanes 7 of width increasing from a point at the bottom to greatest breadth at top are attached helically to said float. A short tube 8 inclosed in the shaft 5 is held concentric to the arbor 1, by a ring 9 which is secured to the tube 8 on the inside thereof, and at the lower end above inturned flange 11 in span groove 10. A collar 12 is secured to the arbor 1 just below the terminal 11 of the inner tube. The tube 8 is engaged in the shaft by locking the ears 13 of the sleeve 8 in the slots 14 of the shaft. When water is not acting to lift the float the ears 13 support the shaft and the collar 12 supports the tube 8, thus preventing the parts from falling apart. A worm 15 encircling the shaft 5 actuates a toothed gear-wheel 16 mounted on a shaft which is connected with a register contained in the casing 17 and having the indicating face 18. The details of the register are immaterial to the invention. A cap 19 removably attached to the arbor 1 by a set screw 20 has a bracket extension 21 which supports the gear-wheel 16 and the register casing 17. The cap covers and protects from dirt and dust the tube 8. The top of the tube 8 is flared for the introduction of oil. Bayonet catch notches 14 are formed in the top end of the shaft 5 and ears 13 are struck out from the sides of the inner tube 8.

The lower end of the arbor 1 is recessed at 22 and the same provided with a conically recessed bottom. A pin 23 attached to the removable plug 24 engages in said recess and has a terminal bearing point 25 as shown in Fig. 5 or bears upon an anti-friction ball as shown in Fig. 4. The float with its supported parts is constructed but slightly lighter than the water displaced, so as to cause it to bear lightly on its bearings, and thus revolve with freedom and without friction. The hollow shaft 5 acts as a lubricating cup and supplies the lubricant to the lateral spindle bearings as well as the recess 22, which being raised above the bottom of the cup and being a separate chamber is free from dust or sediment that may be in the lubricant. The removable plug 24 affords ready access to the bearings.

The float and integral shaft provide a water-tight bearing casing and keep the lateral bearings and the main bearing at the arbor end entirely free from the water, dirt and foreign matter. At the same time a lubricant cup which lubricates the lateral bearings and the end bearing is provided, and the greatest possible protection from foreign particles given to the main bearing. The balancing of the float and the upward bearing reduces the friction and the wear to a minimum.

What I claim is:—

1. A water meter, having in combination an arbor, a tubular shaft, inclosed at one end, concentric thereto and rotatable thereon, a float terminal connected with said shaft, vanes attached to said float, a float bearing at the said inclosed end of the said arbor, and means for registering the revolutions of said float and shaft, substantially as described.

2. A water meter, having in combination an arbor provided with a recess at one terminal, a rotatable tubular shaft engaging thereon and having a float terminal provided with vanes, a bearing pin attached to the float and engaging in the recess of said arbor and means for registering the revolutions of said shaft, substantially as described.

3. A water meter having in combination an arbor, a rotatable tubular shaft inclosed at one end spaced from the arbor and engaging thereon, the said shaft having a float terminal provided with vanes, a bearing therefor at one end of said arbor, and means for registering the revolutions of said float and shaft, substantially as described.

4. A water meter, having in combination an arbor, a rotatable bearing tube spaced therefrom and engaging thereon, a tubular shaft, sealed at one end, concentric to said tube and removably attached thereto, the said shaft having a float terminal provided with vanes, a float bearing at the said end of said arbor at which the tubular shaft is sealed, and means for registering the revolutions of said float and shaft, substantially as described.

5. A water meter, having in combination an arbor, a tubular shaft rotatable thereon provided with a slot, a tube, means for mounting said tube on said arbor, the said tube having an ear adapted to engage in said slot, a float terminal connected with said shaft, vanes attached to said float, a float bearing upon said arbor and means, connected to said shaft, for registering the revolutions of said float, substantially as described.

6. A water meter, having in combination an arbor, a tubular shaft concentric thereto provided with a slot and a bearing ring and tube rotatable on said arbor, a collar fixed to said arbor and adapted to act as a rest for said ring and tube, when the same are not otherwise supported, a float terminal connected with said shaft, vanes attached to said float, a float bearing on said arbor and means, connected to said shaft, for registering the revolutions of said float and shaft, substantially as described.

7. A water meter, having in combination an arbor, having a bearing recess at one end, a tubular shaft rotatable thereon, a float terminal connected with said shaft, vanes attached to said float, a plug engaging within the float end of said shaft and having a bearing member attached thereto and engaging within said bearing recess and means, connected to said shaft, for registering the revolutions of said float and shaft, substantially as described.

8. A water meter, having in combination with a vertical arbor, a tubular shaft concentric thereto and rotatable thereon, a float terminal connected to said shaft, vanes attached to said float, a bearing for said float upon said arbor and within said shaft, the said shaft adapted to act as a lubricant cup, a cap attached to said arbor and engaging over the upper open end of said shaft and means, connected to said shaft, for registering the revolutions of said float and shaft, substantially as described.

9. A water meter, having in combination an arbor, a tubular shaft closed at one end and rotatable on said arbor, a float attached to said tubular shaft, vanes connected to said float, a float bearing upon said arbor and inclosed within said tubular shaft and means, connected to said shaft, for registering the revolutions of said float and shaft, substantially as described.

In testimony whereof, I sign this specification in the presence of two witnesses.

ALVA T. HILL.

Witnesses:
JAY D. STANNARD,
W. P. MARINE.

---

Copies of this patent may be obtained for five cents each, by addressing the "Commissioner of Patents, Washington, D. C."